United States Patent
Frederick

[15] 3,666,227
[45] May 30, 1972

[54] GAUGE FOR PRESS BRAKES AND THE LIKE

[72] Inventor: Robert Frederick, 23W010 St. Charles Rd., Glen Ellyn, Ill. 601137

[22] Filed: Feb. 13, 1970

[21] Appl. No.: 11,119

[52] U.S. Cl..................................248/228, 33/170
[51] Int. Cl..........................................B66d 3/00
[58] Field of Search..................248/298, 285, 228, 287, 286, 248/214, 244, 245, 226 R, 228, 229, 230, 316 R; 287/124; 33/169, 173, 170

[56] References Cited

UNITED STATES PATENTS

| | | | |
|---|---|---|---|
| 2,252,579 | 8/1941 | Rosen | 248/230 |
| 3,236,484 | 2/1966 | Hozeski | 248/163 X |
| 2,733,035 | 1/1956 | Rocheleau | 248/124 |
| 2,635,345 | 4/1953 | Samborski | 248/124 X |

Primary Examiner—J. Franklin Foss
Attorney—Leonard S. Knox

[57] ABSTRACT

An adjustable gauge for use with press brakes, shears and the like machines wherein sheet material is formed or cut and the forming or cutting is to be a specified distance from a reference edge of the sheet. The gauge is provided with a novel form of saddle to enable the gauge to be affixed non-rotatably to one guide bar extending from left to right or non-rotatably to a second guide bar extending fore and aft or, as a plurality, to both bars.

4 Claims, 5 Drawing Figures

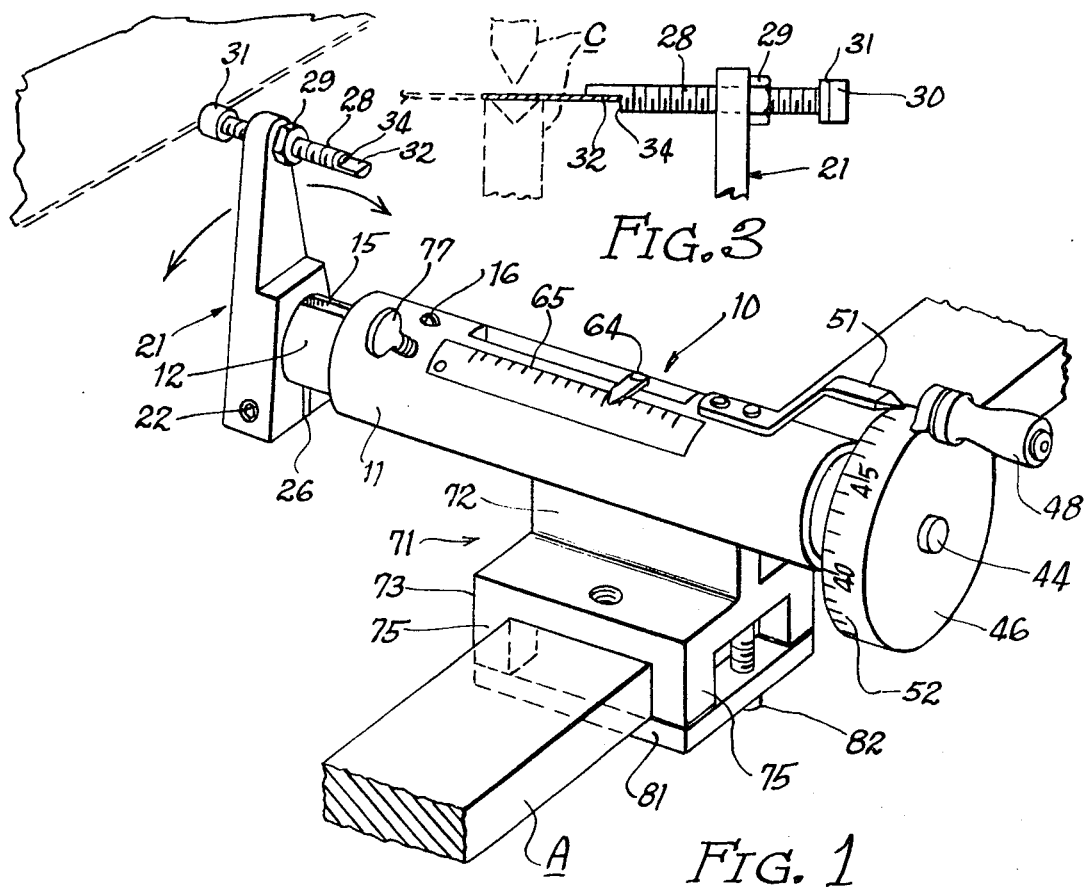
Fig. 3
Fig. 1
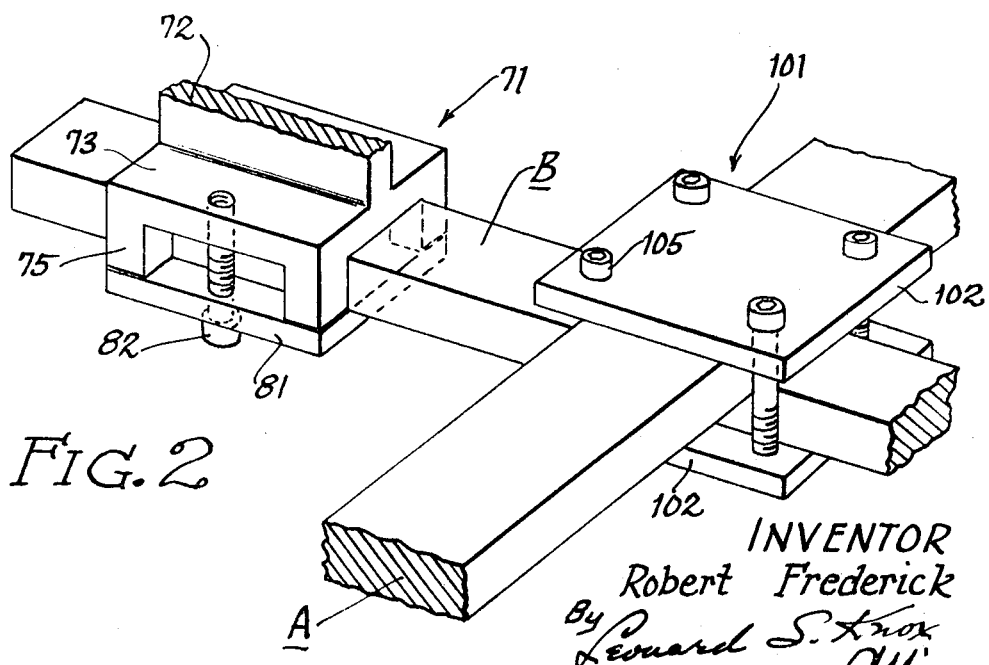
Fig. 2
INVENTOR
Robert Frederick
By Leonard S. Knox
Att'y

GAUGE FOR PRESS BRAKES AND THE LIKE

BACKGROUND OF THE INVENTION

It has been known to provide locating gauges as pointed out in the abstract, but these are inadequate when the locating button of the gauge is approximately coincident with the usual left-to-right guide bar at the rear of the machine. In such cases resort is had to some makeshift expedient which is time-consuming, unreliable and requires painstaking effort to adjust and fix in the most desirable position.

Further, in those cases where the reference edge of the work piece is irregular or at an angle, it becomes necessary to employ two or more gauges and to support the same on means other than the left-to-right bar, e.g. on a bar or bars extending in a fore-and-aft direction.

SUMMARY OF THE INVENTION

The present invention relates to a gauge to be installed to the rear of the forming dies of a press brake, knives of a shear or like machine or, alternatively, on a fore-and-aft bar secured to the left-to-right bar, or otherwise. The foregoing desideratum is achieved by means of a saddle forming an integral part of the gauge having means defining two intersecting recesses to permit securement of the gauge in either of the two ways just mentioned. In a secondary aspect the invention comprehends a novel adjustable device against which the work piece abuts.

BRIEF DESCRIPTION OF THE DRAWINGS

FIG. 1 is an isometric view of the gauge with the saddle secured to the left-to-right bar;

FIG. 2 is an isometric view of the saddle secured to the fore-and-aft bar;

FIG. 3 is a detail of the adjustable abutment;

DESCRIPTION OF THE PREFERRED EMBODIMENT

Where, in this specification, reference is made to a press brake, the same is to be understood only as one example of the environment in which the device may be employed. In general, the device is adaptable to any machine wherein a piece of sheet material is to be reliably located against a stop while a forming or cutting operation is being performed thereon.

Figure 4:
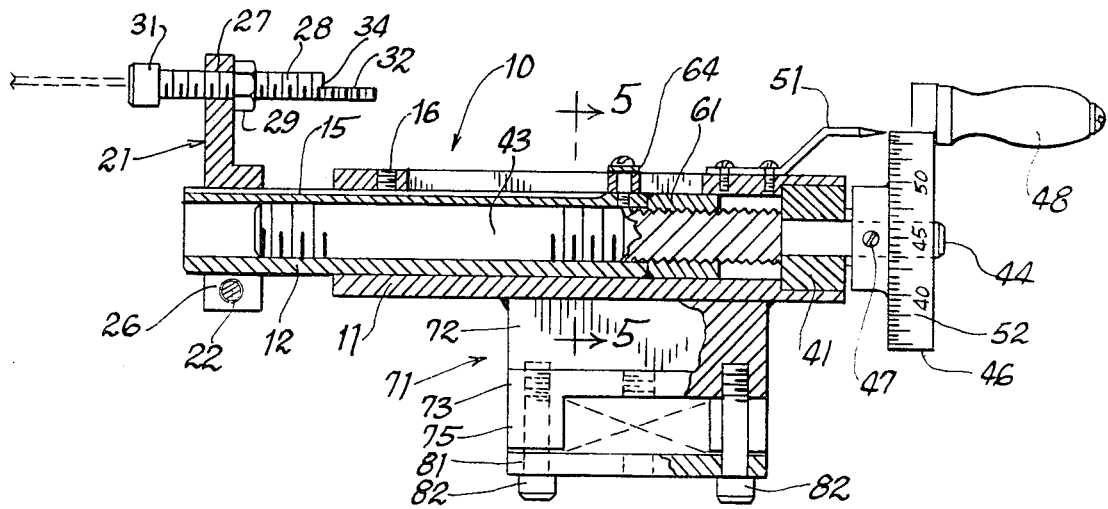
FIG. 4 is a combined longitudinal cross section and elevation of the device as shown in FIG. 1.
Figure 5:
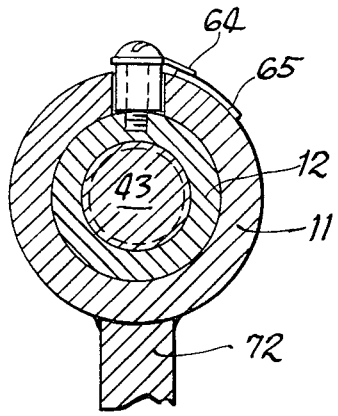
FIG. 5 is a cross section taken on the line 5—5 of FIG. 4.

Adverting to the drawings there is shown (FIGS. 1, 4, and 5) a device 10 embodying the principles of the invention comprising a tubular body 11 providing a guide for a quill 12 which is axially movable in a direction fore-and-aft of a press brake.

The quill 12 has a keyway 15 engaged with a pilot screw 16 in order to assure axial movement of the quill when driven by means to be described. At its outboard end the quill 12 carries an arm 21 provided with a clamping screw 22 which, when loosened, allows rotary adjustment of the arm. The arm 21 is split at 26 to insure that tightening of the screw 22 results in reliable clamping engagement. At its distal end the arm 21 has a threaded hole 27 to receive a work-locating stud 28 which, after being positioned, is fixed by a lock nut 29. The stud 28 has a head 31 at one end and, at the other end, a flat 32 defining a shoulder 34 for a purpose to be described. The body 11 has a bearing 41 secured by welding. Within the quill 12 is a threaded screw 43 having a reduced end 44 to which the fine adjustment wheel 46 is affixed by a set screw 47. The wheel 46 has a handle 48. An index 51 cooperates with the graduations 52 on the circumference of the wheel 46. The pitch of the threads of the screw 43 is in such relation to the graduations 52 that each graduation corresponds to a small increment of axial movement of the screw, say 0.001 inch or the equivalent in the metric system.

Secured to the inner end of the quill 12 is a nut 61 with which the screw 43 is threadably engaged. Thus rotation of the wheel 46 results in longitudinal movement of the quill 12. This latter carries an index 64 cooperative with a scale 65 mounted on the body 11. The scale 65 is marked off in inches or in the metric system and may be regarded as the "coarse" scale, and the graduations 52 as the "fine" scale. After the required setting has been established the same is fixed by means of the thumb screw 77. It is believed that operation of the gauge will be evident from the foregoing description.

The assembly just described is adapted to be mounted on a bar usually provided at the rear of the brake and extending from left to right. This bar is of rectangular cross section with the wider faces horizontal, and is indicated at A. The bar is located at some convenient distance from the die set C (FIG. 3). In use the device of the invention is secured to the bar A by means now to be described.

A standard or saddle 71 of inverted T-shape comprises a stem 72 secured to the body 11, and a head 73, this latter having a flat under side to rest on the bar A. The head 73 is desirably rectangular to provide adequate bearing area and is provided with a downwardly-extending post 75 at each corner. When the bar A and the bar B, to be referred to, are of the same width distance between the posts measured on any of the four sides is the same, subject to minimum tolerances for a sliding fit to preclude rotation of the saddle about any axis in order that the standard may fit over either of bars A and B which, as noted, are the same width. The depth of each post is slightly less than the thickness of the bar A.

A clamping plate 81, essentially coextensive with the area defined by the posts 75, is adapted to abut the lower face of the bar A and is secured by cap screws 82 threadedly engaged in the head 73.

An important feature of the invention device resides in its instant adaptability to either the left-to-right bar A or to a fore-and-aft bar B. This latter is employed in order to gain a range of positions for which the left-and-right bar is inadequate. In the ordinary case two spaced-apart gauges are used, but sometimes it may be necessary to operate on a piece part which has an irregular edge. In such case two or more of the devices spaced apart parallel to the die set C are used and their relative positions may be such that the available adjustment inherent in the gauge per se is outside its range. Under these circumstances one or more fore-and-aft bars B are used (FIG. 2). These are then secured to the bar A by clamps 101 comprising a pair of plates 102 drawn together by cap screws 105. Preferably these screws are located so as to bear on the edges of both bars A and B to insure against relative rotation therebetween. It will be clear from FIGS. 1 and 2, that the inner or working faces of the four posts 75 are contiguous to the companion or vertical faces of the bars A and B. Accordingly, irrespective of whether the saddle 71 is carried on bar A or B, their relationship is non-rotatable about any axis. Obviously, sliding clearance is provided between the posts 75 and the bars.

It was mentioned above that the length of the posts 75 is slightly less than the thickness of the bars A and B. This expedient allows the plate 81 to be pulled up tightly without abutting the end face of the posts, thus to assure full clamping friction over the entire abutting faces of the saddle, clamping plate and bar.

The adjustable stop 28 may be used in two ways: one, with the head 31 as the locating surface for the work piece and two, with the shoulder serving that purpose. In the second case the screw is simply turned end for end with the flat face upward, and will be desirably used when the piece part is flaccid and requires some degree of outboard support. However, the flat 32 may face downwardly if desired.

Alternatively, the head 31 may be equipped with a permanent magnet 30 (FIG. 3) further to insure location of an iron-containing piece part.

The bar A is usually supported on the machine at its ends in slotted brackets. Such positioning in the vertical sense need not be attended with special care since the arm 21 may be swung on its axis to position the stud 28 in alignment with the edge of the piece part, and there tightened by the screw 22.

The vertical displacement of the gauge occasioned by the lapped arrangement of bars A and B is readily accommodated by circular adjustment of the arm 21.

From the foregoing description it will have become evident that the invention device is characterized by great simplicity and versatility, and dispenses with the need for shims and special fitments in order to be mounted for a variety of working conditions.

I claim:

1. In an adjustable gauge for locating a work piece in a press brake or like machine, the gauge including a body to carry the adjusting means, and the body being adapted to be detachably secured selectively to one of two bars fixed to the machine and mutually disposed at right angles, said bars having the same width and thickness, the improvement which comprises a saddle forming a part of the body having a face to rest on one face of the selected bar, said saddle having four downwardly extending members to be disposed in pairs on opposite vertical sides of the selected bar when the gauge is attached thereto, said members each having a face in contiguous sliding contact with the selected bar, the distance between each confronting pair of member faces measured transversely of the selected bar being the same and such as to provide a sliding fit on the selected bar in either of two positions displaced 90° from each other, and means for clamping the saddle to the bar in a predetermined position.

2. The improvement in accordance with claim 1 in which said clamping means comprises a plate parallel to said saddle face and screw-threaded means to provide clamping force.

3. An adjustable gauge to locate a workpiece in a press brake or like machine, the machine being provided with two fixed bars at right angles to each other the gauge including a body adapted for detachable securement selectively to one of said bars, said bars being the same width and positioned with one of the widthwise faces uppermost, a pad secured to the gauge having a face to be located contiguous to the widthwise face of a selected one of the bars in sliding engagement therewith, two pairs of posts depending from the pad to straddle the vertical faces of the selected bar and the posts having a longitudinal sliding fit on the selected bar, the posts having minimum tolerance for said fit to preclude rotational movement in a horizontal plane, and means to secure the pad to the selected bar.

4. An adjustable gauge to locate a workpiece on a press brake or like machine, said machine having at least one fixed bar extending from left to right and at least one fixed bar extending fore-and-aft, said bars being of the same rectangular transverse cross section, a saddle secured to the gauge, said saddle having means defining a pair of intersecting recesses through the saddle, the recesses being mutually at right angles and both recesses being cross-sectionally congruent with the cross section of the bars with minimum clearance for a sliding fit therebetween, whereby the saddle may be mounted on either a left-to-right bar or a fore-and-aft bar interchangeably and means to secure the saddle to the bar whereby, when secured to the bar the gauge axis is perpendicular to the edge of the work piece.

* * * * *